United States Patent [19]

Ukigai et al.

[11] Patent Number: 4,544,033

[45] Date of Patent: Oct. 1, 1985

[54] OIL RECOVERY PROCESS

[75] Inventors: Toshiyuki Ukigai, Chiba; Masaaki Hagiwara, Ichikawa; Junichi Yamada, Chiba, all of Japan

[73] Assignee: Lion Corporation, Tokyo, Japan

[21] Appl. No.: 592,972

[22] Filed: Mar. 23, 1984

[30] Foreign Application Priority Data

Apr. 4, 1983 [JP] Japan ................................ 58-57784

[51] Int. Cl.$^4$ .............................................. E21B 43/22
[52] U.S. Cl. .................................................... 166/274
[58] Field of Search ....................... 166/273, 274, 275; 252/8.55 D

[56] References Cited

U.S. PATENT DOCUMENTS

| | | | |
|---|---|---|---|
| 3,348,611 | 10/1967 | Reisberg | 166/274 X |
| 3,373,809 | 3/1968 | Cooke, Jr. | 166/274 X |
| 3,446,282 | 5/1969 | Cooke, Jr. | 166/274 |
| 3,474,865 | 10/1969 | Gogarty et al. | 166/274 |
| 3,506,070 | 4/1970 | Jones | 166/273 X |
| 3,508,612 | 4/1970 | Reisberg et al. | 166/274 |
| 4,045,084 | 8/1977 | Hsueh et al. | 175/69 X |
| 4,090,967 | 5/1978 | Falk | 252/2 X |
| 4,446,036 | 5/1984 | Hsieh et al. | 166/274 X |

*Primary Examiner*—Stephen J. Novosad
*Attorney, Agent, or Firm*—Armstrong, Nikaido, Marmelstein & Kubovcik

[57] ABSTRACT

A process for recovering oil from an oil-bearing subterranean reservoir penetrated by at least one injection well and at least one production well which comprises the steps of:

(1) injecting into the oil-bearing subterranean reservoir through the injection well a first injecting fluid consisting essentially of (a) 1% to 30% by weight of an internal olefin sulfonate having 10 to 26 carbon atoms and a disulfonate content of 20% by weight or less, (b) 0.1% to 20% by weight of a cosurfactant, and (c) a brine;

(2) injecting, as a second injecting fluid, an aqueous polymer solution having a viscosity higher than that of the first injecting fluid into the oil-bearing subterranean reservoir; and (3) recovering oil replaced with the first and second injecting fluids through the production well. This process can recover oil from subterranean reservoirs at a high oil recovery efficiency without destroying a micro-emulsion during sweeping in the subterranean reservoir even when the salt concentration of the formation water is widely changed.

5 Claims, No Drawings

OIL RECOVERY PROCESS

BACKGROUND OF THE INVENTION

1. Field of the Invention

The present invention relates to a micellar drive method for recovering petroleum or crude oil (hereinafter referred to as "oil") from subterranean reservoirs. More specifically, it relates to a process for recovering oil from an oil-bearing subterranean reservoir at a high oil recovery efficiency by injecting an aqueous surfactant solution into an oil-bearing subterranean reservoir through an injection well. The aqueous surfactant solution forms a micro-emulsion having a low interfacial tension and drives the oil-bearing subterranean.

2. Description of the Prior Art

A micellar drive method is known in the art as one of the so-called "enhanced oil recovery (EOR)" methods for recovering oil from old or used oil-bearing subterranean reservoirs. According to the micellar drive method, a micellar slug, that is, a clear micro-emulsion derived from water and oil such as petroleum, petroleum distillates, or fuel oil, is injected under pressure into the subterranean reservoirs for the recovery of oil remaining in the subterranean reservoirs. The micellar drive methods are disclosed in, for example, U.S. Pat. Nos. 3,506,070, 3,613,786, 3,740,343, 3,983,940, 3,990,515, 4,017,405, and 4,059,154. These prior arts disclose that various kinds of surfactants including anionic-, nonionic-, and cationic-type surfactants are used as an essential constituent alone or in any mixture thereof in the formation of micellar slugs. Examples of such surfactants are petroleum sulfonates, alkylaryl sulfonates, dialkyl sulfosuccinates, alkane sulfonates, polyoxyethylene alkylether sulfates, alpha-olefin sulfonates, polyoxyethylene alkylethers, polyoxyethylene alkylphenylethers, polyol fatty acid esters, alkyltrimethyl ammonium salts, and dialkyldimethyl ammonium salts.

It has been proposed, as an improved micellar drive method in which a micro-emulsion is injected into an oil-bearing subterranean reservoir, that an aqueous solution containing a surfactant and a cosurfactant is injected into a subterranean reservoir to form a micro-emulsion and to sweep the subterranean reservoir. The aqueous surfactant solution injected into the subterranean reservoir should have the following requirements so as to form a micro-emulsion in the subterranean reservoirs. That is, in order to recover oil from the subterranean reservoir, the aqueous surfactant solution should have: sufficiently low interfacial tensions between an oil and a brine: a viscosity higher, but not too much higher, than those of both subterranean water (or formation water) and oil; and a capability to rapidly form a microemulsion upon contact with oil. Furthermore, a surfactant should have a good salinity tolerance and hardwater resistance, since the salt concentration range of the formation water extends widely from a low to high concentration depending upon oil fields. These problems are not satisfactorily solved in the prior art.

SUMMARY OF THE INVENTION

Accordingly, an object of the present invention is to eliminate the above-mentioned problems in the prior art and to provide a process for recovering oil from an oil-bearing subterranean reservoir at a high recovery efficiency, while maintaining the stability of a microemulsion during sweeping in the subterranean reservoirs even when the salt concentration of the formation water is widely changed.

Other objects and advantages of the present invention will be apparent from the following description.

In accordance with the present invention, there is provided a process for recovering oil from an oilbearing subterranean reservoir penetrated by at least one injection well and at least one production well, which comprises the steps of:

(1) injecting into the oil-bearing subterranean reservoir through the injection well a first injecting fluid consisting essentially of (a) 1% to 30% by weight of an internal olefin sulfonate ("IOS" hereinbelow) having 10 to 26 carbon atoms and a disulfonate ("DS" hereinbelow) content of 20% by weight or less, (b) 0.1% to 20% by weight of a cosurfactant, and (c) brine;

(2) injection, as a second injecting fluid, an aqueous polymer solution having a viscosity higher than that of the first injecting fluid into the oil-bearing subterranean reservoir; and (3) recovering oil replaced with the first and second injecting fluids through the production well.

DESCRIPTION OF THE PREFERRED EMBODIMENTS

The first injecting fluids used in the present oil recovery process contain, as essential constituents, internal olefin sulfonates having 10 to 26 carbon atoms, a disulfonate content of 20% by weight or less, and cosurfactants.

The internal olefin sulfonates usable in the present invention are those generally obtained by sulfonating internal olefins containing as a main constituent vinylene-type monoolefin having 10 to 26 carbon atoms, desirably 12 to 24 carbon atoms, and having a general formula:

R—CH=CH—R' wherein R and R' are independently straight- or branched-chain saturated hydrocarbon radicals having 1 or more carbon atoms provided that the total carbon atom number of R and R' is 8 to 24, desirably 10 to 22, and optionally containing about 33% by weight (about one third of the olefins) or less of tri-substituted type monoolefins, followed by neutralizing the sulfonated products with appropriate bases and then, optionally, hydrolyzing the neutralized products. The internal olefin sulfonates thus prepared generally contain about 10% to about 60% by weight of alkenyl sulfonates having a double bond and about 90% to about 40% by weight of hydroxyalkane sulfonates, and also contain about 80% by weight or more of monosulfonates and about 20% by weight or less of disulfonates. It should be noted, however, that internal olefin sulfonates having compositions different from the above-mentioned composition ratios can be prepared by appropriately selecting the sulfonation conditions and hydrolysis conditions. Generally speaking, the increase in the carbon atom number of the internal olefin tends to result in an increase in the composition ratio of the alkenylsulfonate. On the other hand, the increase in the mol ratio of the sulfonating agent to the internal olefin during the sulfonation tends to result in an increase in the composition ratio of the disulfonate.

The content of the disulfonate in the internal olefin sulfonates usable in the present invention should be about 20% by weight or less. A disulfonate content of more than 20% by weight does not reduce the oil-water interfacial tension of the first injecting fluid and, therefore, decreases the oil recovery efficiency due to the relatively large interfacial tension of the microemulsion formed in the subterranean reservoir. Thus, a small content of the disulfonate in the internal olefin sulfonates increases the salinity tolerance and the resistance against the change in the salt concentration of the formation water, without impairing the interfacial tension decreasing capability of the internal olefin sulfonates. Accordingly, the content of the disulfonates in the internal olefin sulfonates is desirably about 0.5% to about 15% by weight, more desirably about 1% to about 12% by weight.

The internal olefin sulfonates usable in the present invention can be alkali metal salts, alkaline earth metal salts, ammonium salts, and organic amine salts thereof. The desirable counter cations are Na, K, Mg, NH$_4$, and alkanolammonium.

Examples of internal olefin sulfonates suitable for use in the present invention are: internal olefin sulfonate having 12, 13, 14, 15, 16, 17, 18, 20, 22, 24, 12–16, 13–15, 14–16, 14–18, 15–18, 16–18, 16–20, 18–20, and 20–24 carbon atoms. These internal olefin sulfonates may be used alone or in any mixture thereof.

The amount of the internal olefin sulfonates contained in the first injecting fluid used in the present invention is suitably about 1% to about 30% by weight, more preferably 3% to 25% by weight. The content of the internal olefin sulfonate of less than about 1% by weight cannot form a large amount of the desired microemulsions in the subterranean reservoirs due to the dilution with the formation water. This undesirably decreases the oil recovery efficiency due to the insufficient growth of oil banks in the subterranean reservoirs. Contrary to this, the content of the internal olefin sulfonate of more than about 30% by weight is not economical due to the increase in the internal olefin sulfonate consumption cost, although the desired oil banks are easily formed in the subterranean reservoirs.

The first injecting fluids used in the present invention also contain, as an essential constituent, cosurfactants. The cosurfactants, together with the internal olefin sulfonates, form the desired microemulsions in the subterranean reservoirs. The cosurfactants suitable for use in the present invention are those having an alcoholic hydroxyl group. The desirable cosurfactants are alcohols having the general formula:

R"O(CH$_2$CH$_2$O)$_n$H wherein n is a number of from 0 to about 4 and R" is an alkyl or alkenyl group having 3 to 8 carbon atoms when n is zero, and an alkyl, alkenyl, a phenyl or an alkylpheny group having 6 to 15 carbon atoms when n is not zero. The aliphatic groups of R" may be straight-chain or branched-chain groups.

Examples of such alcohols are butanols, pentanols, hexanols, 2-ethylhexanol or other octanols, polyoxyethylene hexylethers ($\bar{n}=1$), polyoxyethylene decylethers ($\bar{n}=2$), polyoxyethylene tridecylethers ($\bar{n}=4$), polyoxyethylene butylphenylethers ($\bar{n}=2$), polyoxyethylene nonylphenylethers ($\bar{n}=3$), and polyoxyethylene dodecylphenylethers (n =4).

As mentioned above, the first injecting fluids used in the present invention can contain about 0.1% to about 20% by weight of the cosurfactants. However, the preferable concentration of the cosurfactants in the first injecting fluids is within the range of about 1% to about 10% by weight from the viewpoint of the formability of the micro-emulsions and the decreasing capacity for the interfacial tensions.

Since the first injecting fluids used in the present invention contain, as a surfactant, internal olefin sulfonates having excellent salinity tolerance and hard-water resistance, any aqueous media including soft water, hard water, and brines having a high salt concentration can be used in the preparation of the first injecting fluids. For example, rain water, river water, lake water, formation water, oil stratum water, and seawater can be freely used. Regarding the hard-water resistance, brine containing a large amount of multivalent metal ions (for example, about 5000 ppm of an Mg ion, i.e., about 2.6% by weight in terms of MgSO$_4$) can be used in the present invention. Furthermore, water (or brine) containing about 10% by weight of alkali metal salts (irrespective of the type of the alkali metal salts) can be used. In particular, when the other surfactants are contained, in addition to the internal olefin sulfonates, in the first injecting fluids or when appropriate cosurfactants are selected, brine having an alkali metal salt concentration of about 15% by weight can be used in the present invention. Thus, water (or brine) usable in the formation of the first injecting fluids used in the present invention can contain 0% to about 15% by weight, preferably about 0.5% to about 12% by weight and more preferably about 1% to about 10% by weight, of inorganic salts. Typical examples of the inorganic salts contained in the water (or brine) are NaCl, KCl, Na$_2$SO$_4$, and K$_2$SO$_4$. For instance, seawater contains about 3.5% by weight of inorganic salts including about 1,600 ppm, in terms of an Mg ion, of divalent metal ions. This salt concentration is within the preferable salt concentration range of the water used in the present invention.

The first injecting fluids used in the present invention can optionally contain other auxiliary surfactants together with the internal olefin sulfonates. Examples of such auxiliary surfactants are anionic surfactants and nonionic surfactants such as petroleum sulfonates, alkylbenzene sulfonates, polyoxyethylene alkylether sulfates, dialkyl sulfosuccinates, alphaolefin sulfonates, paraffin sulfonates, soaps, higher alcohol ethoxylates, alkylphenol ethoxylates, polyol fatty acid esters, fatty acid alkylol amides, and polyoxyethylene fatty acid amides.

Furthermore, any conventional thickening agent can be optionally used in the first injecting fluid according to the present invention, since the viscosity of the first injecting fluid is relatively low. Examples of such thickening agents are water-soluble polymer substances used in the second injecting fluids according to the present invention mentioned hereinbelow. A small amount of oil (or petroleum) can also be added to the first injecting fluid for this purpose.

The second injecting fluids injected into the subterranean reservoir subsequent to the first injecting fluids, according to the present invention, are an aqueous polymer solution having a viscosity higher than that of the first injecting fluids. The water-soluble polymer substances usable as the second injecting fluid are either natural or synthetic substances. Examples of such water-soluble polymer substances are heteropolysaccharides produced by microbes, naphthalenesulfonic acid-formaldehyde condensates, polyacrylamides, polyacrylates, hydroxyethylcelluloses, and carboxymethylcelluloses. The concentration of the water-soluble polymer substances in the second injecting fluids are appropriately selected depending upon, for example, the viscosity of the first injecting fluids, and the types and molecular weights of the water-soluble polymer substances. The suitable concentration is about 0.01% to about 1% by weight.

According to the present invention, oil in the subterranean reservoirs is recovered by, for example, injecting the first injecting fluid into at least one injection well and then injecting the second injecting fluid into the same injection well to recover oil from at least one production well. The suitable amount of the first injecting fluid injected into the injection well is about 3% to about 25% by volume of the porosity of the subterranean reservoirs.

According to the oil recovery process of the present invention, micro-emulsions are formed in the subterranean reservoirs and, therefore, aqueous surfactant solutions containing no substantial amount of oil can be used as the first injecting fluid. Accordingly, the present oil recovery process is economically advantageous due to the fact that no addition of oil into the subterranean reservoir is required. Furthermore, the present oil recovery process substantially belongs to the micellar drive method and uses as a surfactant the internal olefin sulfonates, which exhibit an excellent salinity tolerance and hard-water resistance and can form the desired micro-emulsions having a very low interfacial tension and sweep the subterranean reservoirs. As a result, the following remarkable and advantageous features can be obtained:

(1) Either soft water, seawater, or formation water having a high salt concentration can be freely used;

(2) The micro-emulsions formed in the subterranean reservoirs are subjected to no substantial adverse effects by inorganic salts present in the formation water;

(3) The micellar drive method can be readily applied in subterranean reservoirs containing from a low viscosity oil to a high viscosity oil; and (4) A high oil recovery efficiency can be attained since stable micro-emulsions are maintained in the subterranean reservoirs.

EXAMPLES

The present invention now will be further illustrated by, but is by no means limited to, the following Examples, in which the component ratios or amounts of samples used are based on "% by weight" unless otherwise specified.

EXAMPLE 1

A first injecting fluid was prepared by weighing 6.0% of sodium $C_{15}$–$C_{17}$ internal olefin sulfonates (i.e., $C_{15}$–$C_{17}$ IOS-Na) having a disulfonate (DS) content of 8% based on the effective component as a surfactant, 3.0% of amyl alcohol as a cosurfactant, and 91% of an aqueous sodium chloride solution containing 5% of sodium chloride dissolved in demineralized water as a brine in a beaker. The resultant mixture was stirred at 100 rpm for 10 minutes at a temperature of 25° C.

A second injecting fluid was prepared by dissolving 1500 ppm of xanthane gum in the brine.

In order to evaluate micro-emulsion forming capability of the sample in a core, a test was carried out by using Berea sandstone core having a size of 3.8 cm diameter and 7 cm length and having a permeability of about 500 mD and a porosity of about 20%.

A core thoroughly saturated with brine was set in a core holder and, then, fuel oil was injected under pressure into the core at a feed rate of 6 cc/min until no brine was discharged. Brine was then injected under pressure at the same feed rate by a water drive method until the content of the fuel oil in the effluent became less than 0.1%. Thus, the fuel oil was recovered.

After the water drive method, the first injecting fluid was injected under pressure into the core at a feed rate of 0.1 cc/min in an amount of 15% by volume of the pore volume and the second injecting fluid was then injected under pressure at a feed rate of 0.1 cc/min in an amount of 100% by volume of the pore volume. 15 cc of a liquid was obtained as the first effluent when the first and second injecting fluids were injected and was observed after being allowed to stand. As a result, a clear (or transparent) micro-emulsion was formed.

EXAMPLE 2

A first injecting fluid was prepared by weighing 6.0% of $C_{15}$–$C_{17}$ IOS-Na having a DS content of 8% based on the effective component as a surfactant, 3.0% of amyl alcohol as a cosurfactant, and 91% of an aqueous sodium chloride solution containing 5% of sodium chloride dissolved in demineralized water as a brine in a beaker. The resultant mixture was stirred at 100 rpm for 10 minutes at a temperature of 25° C. The IOS having different DS contents were prepared by changing the mol ratio of the starting internal olefins and $SO_3$ in the sulfonation reaction.

A second injecting fluid was prepared by dissolving 1500 ppm of xanthane gum in the brine.

The micro-emulsion forming capabilities, the interfacial tension decreasing capabilities of the formed micro-emulsions, and the oil recovery efficiencies of the first injecting fluids (i.e., samples) were evaluated as follows.

The micro-emulsion forming capabilities were determined from the visual appearance of the micro-emulsions as to whether a micro-emulsion was formed (i.e., "O") or not (i.e., "X") when the sample and oil was mixed at a sample/oil ratio of 5/3.

The interfacial tensions were measured by a spinning drop type tensiometer at 71° C. in an appropriately diluted system.

The oil recovery tests were carried out by using a Berea sandstone core having a size of 3.8 cm diameter and 28 cm length and having a permeability of about 500 mD and a porosity of about 20% as follows.

A core thoroughly saturated with brine was set in a core holder and then fuel oil was injected under pressure into the core at a feed rate of 6 cc/min until no brine was discharged. Brine was then injected under pressure at the same feed rate in a water drive method until the content of the fuel oil in the effluent became less than 0.1%. Thus, the fuel oil was recovered.

After the water drive method, a micellar drive method was carried out by placing the core holder and the micro-emulsions in a constant temperature bath at a temperature of 71° C. The first injecting fluids were first injected under pressure into the core at a feed rate of 2 feet/day in an amount of 15% by volume of the pore volume, the second injecting fluid was then injected under pressure into the core at a feed rate of 2 feet/day in an amount of 100% by volume of the pore volume, and, finally, brine was injected under pressure into the core at a feed rate of 2 feet/day in an amount of 100% by volume of the pore volume. Thus, the fuel oil was recovered. The oil recovery efficiency was determined by measuring the amount of water in the core, after testing by a toluene azeotropic method.

The test results are shown in Table 1. In Table 1, sample No. 1 is an example according to the present invention and sample Nos. 2 and 3 are comparative examples. Sample No. 2 was prepared in the same manner as for sample No. 1, except that no cosurfactant was used and 20% by volume of the pore volume of the sample (i.e., the first injecting fluid) was injected into the core. Sample No. 3 was prepared by using the composition listed in Table 1 to form a micro-emulsion. This micro-emulsion was injected as the first injecting fluid into the core under pressure in an amount of 10% by volume of the pore volume.

As is clear from the results shown in Table 1, when sample 1 was used according to the present invention, an oil recovery efficiency higher than that of sample 2 and comparable to sample 3 (i.e., micro-emulsion) was obtained. Thus, since no oil was introduced into the subterranean reservoir, the present process is economical.

TABLE 1

| | | Sample No. | | |
|---|---|---|---|---|
| | | 1 | 2*1 | 3*1 |
| Internal olefin sulfonate | | $C_{15}$–$C_{17}$ IOS-Na | | |
| Disulfonate content (effective component) | | 8 | 8 | 8 |
| Injecting fluid composition (%) | Surfactant | 6.0 | 6.0 | 10.5 |
| | Cosurfactant | 3.0 | — | 4.5 |
| | Fuel oil | — | — | 17 |
| | Brine | 91 | 94 | 68 |
| Injecting volume (% per pore volume) | | 15 | 20 | 10 |
| Micro-emulsion forming capability | | O | X | O |
| Interfacial tension ($\times 10^3$ dyne/cm) | | 5.1 | — | 4.8*2 |
| Oil recovery (%) | | 89 | 69 | 90 |

*1Comparative example
*2Determined after appropriate dilution by means of a spinning-drop type tensiometer

EXAMPLE 3

Various first injecting fluids were prepared by weighing 6.0% of $C_{15}$–$C_{17}$ IOS-Na having different DS contents in the effective component as a surfactant, 3.0% of amyl alcohol as a cosurfactant, and 91% of an aqueous sodium chloride solution containing 5% of sodium chloride dissolved in demineralized water as a brine in a beaker. The resultant mixture was stirred at 100 rpm for 10 minutes at a temperature of 25° C.

A second injecting fluid was prepared by dissolving 1500 ppm of xanthane gum in the brine.

The micro-emulsion forming capabilities, the interfacial tension decreasing capabilities of the formed micro-emulsions, and the oil recovery efficiencies of the first injecting fluids were evaluated in the same manner as in Example 2.

The results are shown in Table 2.

TABLE 2

| | Sample No. | | | |
|---|---|---|---|---|
| | 4 | 5 | 6 | 7 |
| Internal olefin sulfonate | $C_{15}$–$C_{17}$ IOS-Na | | | |
| Disulfonate content (% per effective component) | 1 | 5 | 18 | 23 |
| Micro-emulsion forming capability | O | O | O | O |
| Interfacial tension ($\times 10^3$ dyne/cm) | 4.4 | 5.1 | 10.2 | 19.7 |
| Oil recovery (%) | 91 | 89 | 82 | 72 |

EXAMPLE 4

Various first injecting fluids were prepared by weighing 6.0% of $C_{15}$–$C_{17}$ IOS-Na, $C_{13}$–$C_{14}$ IOS-Mg, or $C_{18}$–$C_{20}$ IOS-K as a surfactant, 3.0% of amyl alcohol, and 91% of a brine containing the given amount of sodium chloride or a mixture of sodium chloride with calcium chloride or magnesium chloride in a beaker. The resultant mixture was stirred at 100 rpm for 10 minutes at a temperature of 25° C.

A second injecting fluid was prepared by dissolving 1500 ppm of xanthane gum in the brine.

The micro-emulsion forming capabilities, the interfacial tension decreasing capabilities of the formed micro-emulsions, and the oil recovery efficiencies of the first injecting fluids were evaluated in the same manner as in Example 2.

The results are shown in Table 3.

TABLE 3

| | Sample No. | | | | | |
|---|---|---|---|---|---|---|
| | 8 | 9 | 10 | 11 | 12 | 13 |
| Surfactant | $C_{15}$–$C_{17}$ IOS-Na | | | | $C_{13}$–$C_{14}$ IOS-Mg | $C_{18}$–$C_{20}$ IOS-K |
| Disulfonate content (%) | 8 | 8 | 8 | 8 | 6 | 9 |
| Brine (%) | | | | | | |
| NaCl | 3 | 8 | 5 | 5 | 12 | 4 |
| $CaCl_2$ | — | — | 0.5 | — | — | — |
| $MgCl_2$ | — | — | — | 0.5 | — | — |
| Micro-emulsion forming capability | O | O | O | O | O | O |
| Interfacial tension ($\times 10^{-3}$ dyne/cm) | 5.8 | 5.1 | 4.8 | 4.9 | 9.8 | 6.3 |
| Oil recovery (%) | 88 | 90 | 90 | 90 | 81 | 89 |

We claim:

1. A process for recovering oil from an oil-bearing subterranean reservoir penetrated by at least one injection well and at least one production well which comprises the steps of:
   (1) injecting into the oil-bearing subterranean reservoir through the injection well a first injecting fluid consisting essentially of (a) 1% to 30% by weight of an internal olefin sulfonate having 10 to 26 carbon atoms and a disulfonate content of 20% by weight or less, (b) 0.1% to 20% by weight of a cosurfactant, and (c) a brine;
   (2) injecting, as a second injecting fluid, an aqueous polymer solution having a viscosity higher than that of the first injecting fluid into the oil-bearing subterranean reservoir; and (3) recovering oil replaced with the first and second injecting fluids through the production well.

2. A process as claimed in claim 1, wherein said surfactant is an internal olefin sulfonate having 12 to 24 carbon atoms.

3. A process as claimed in claim 1, wherein said surfactant is prepared by sulfonating internal olefins containing as a main constituent vinylene-type monoolefin having 10 to 26 carbon atoms and having a general formula:

$$R-CH=CH-R'$$

wherein R and R' are independently straight- or branched-chain saturated hydrocarbon radicals having 1 or more carbon atoms, provided that the total carbon atom number of R and R' is 8 to 24, followed by neutralizing the sulfonated products with appropriate bases and then, optionally, hydrolyzing the neutralized products.

4. A process as claimed in claim 1, wherein said cosurfactant has the general formula;

$$R''O(CH_2CH_2O)_nH$$

wherein n is a number of from 0 to about 4 and R'' is an alkyl or alkenyl group having 3 to 8 carbon atoms when n is zero and an alkyl, alkenyl, a phenyl, or an alkylphenyl group having 6 to 15 carbon atoms when n is not zero.

5. A process as claimed in claim 1, wherein said brine is contained in an amount of 50% to 98.9% by weight in the first injecting fluid.

* * * * *